Patented Oct. 1, 1935

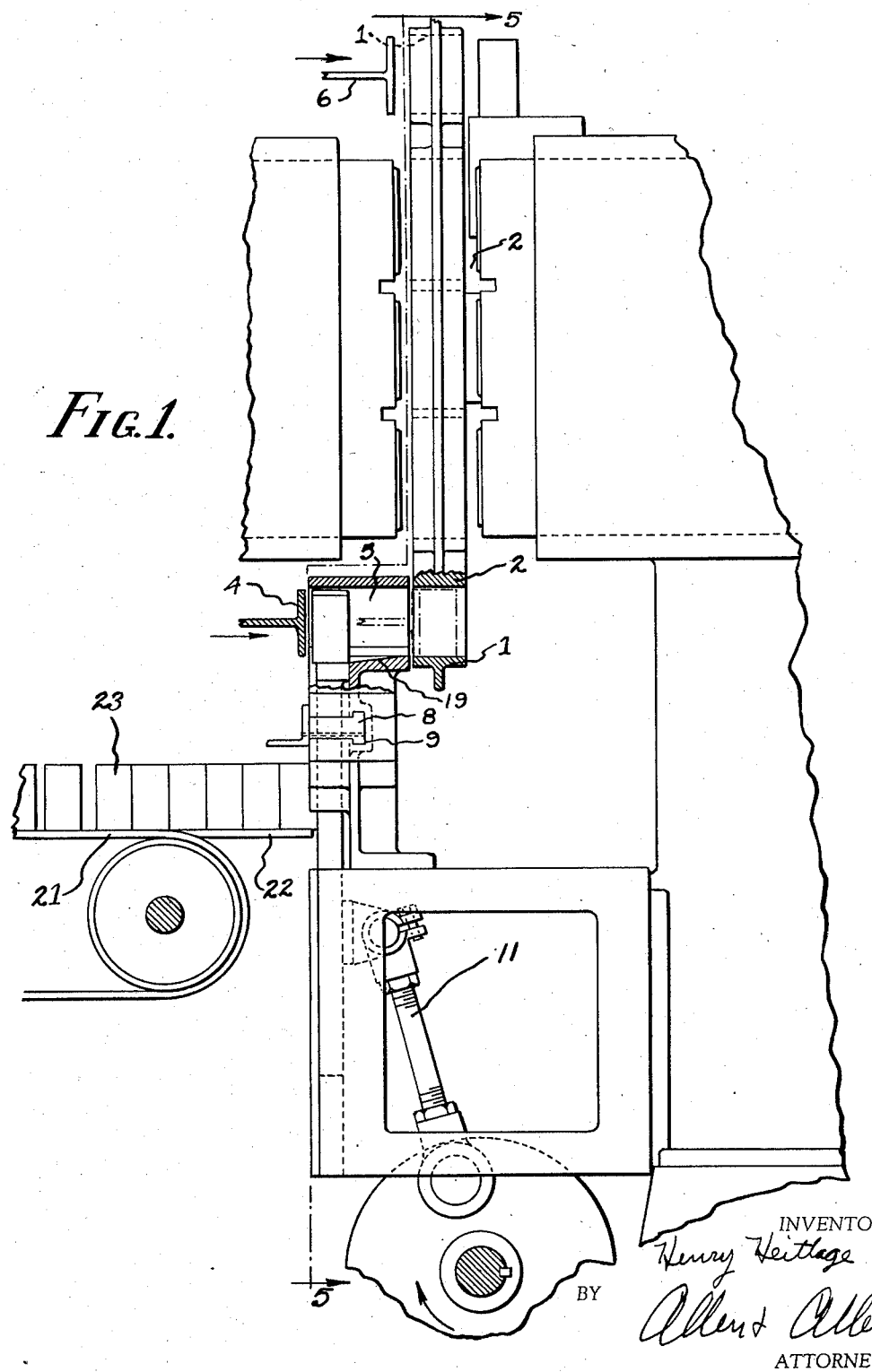

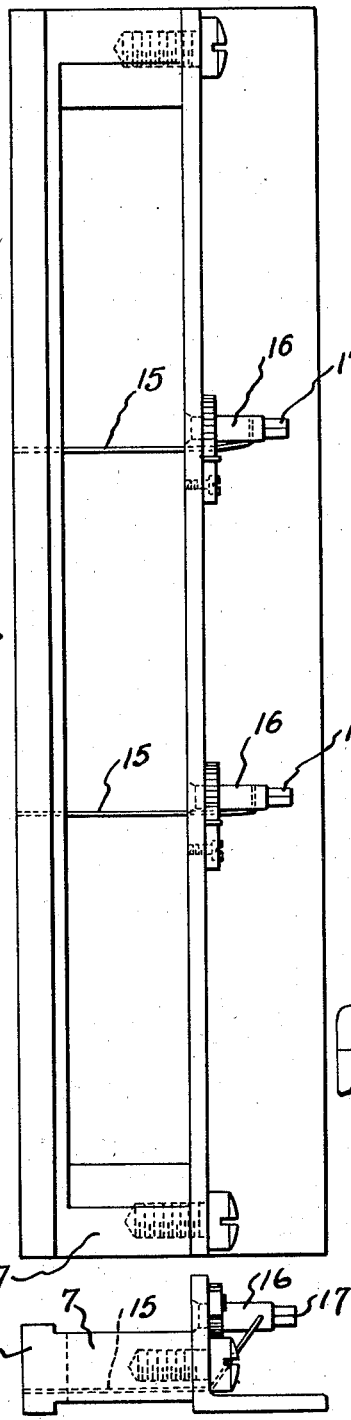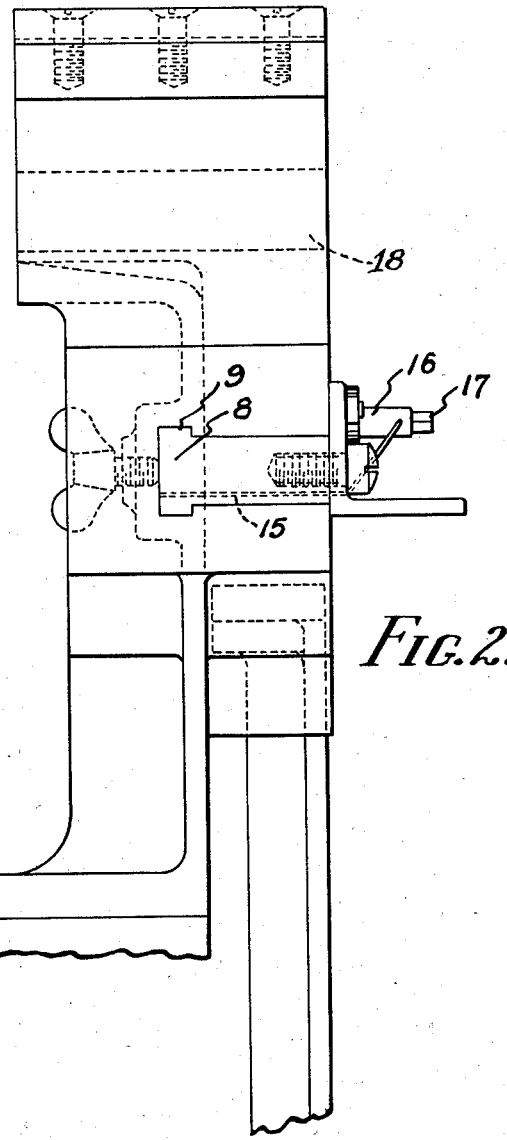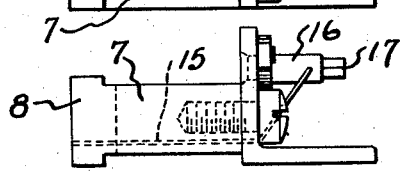

2,015,798

UNITED STATES PATENT OFFICE 2,015,798

METHOD OF AND APPARATUS FOR HANDLING AND STAMPING PLASTIC MATERIAL

Henry Heitlage, St. Bernard, Ohio, assignor to The Procter & Gamble Company, Cincinnati, Ohio, a corporation of Ohio Application September 27, 1933, Serial No. 691,187

11 Claims. (Cl. 25—7)

This invention relates to an improvement in the method of handling and stamping of plastic soap-like material, and in devices for use in same.

The object of my invention is to provide means which will permit greater economy in cutting, drying and stamping of bars of soap and similar materials.

While this invention will be described as applying to the cutting and stamping of soap, it should be understood that it applies to other plastic or semi-plastic materials of similar physical nature, which require a skin or surface drying prior to stamping.

In the ordinary practice of preparing bars of soap for the market, it is customary to cut the soap into long bars two, three or four times the length of the finished bar and to then cut these long bars into individual bars of the required size and then to dry the individual bars with heated air on drying racks sufficiently to form a dry skin on the outer surface of the soap before stamping. Drying with heat may of course be omitted in case of materials the surface of which forms a layer or coating.

The individual bars are next fed to the stamping machine by placing them on a moving belt conveyor or other device with the bars arranged in proper position to feed directly into the stamping machine. Where many bars are to be stamped, machines have been developed which will stamp two or more bars simultaneously, in which case the bars of soap must be placed on the belt conveyor by the operator in two or more parallel lines. The stamping machine, if it is of the multiple die box construction, then receives one bar from each of the several lines simultaneously and stamps it, after which the bars are discharged from the machine, and in the meantime other bars are delivered from the feeding conveyor into the stamping machine. Some machines have been developed, particularly of the so-called Jones type, which receive and stamp three bars simultaneously, and such machines are in common use at the present time.

My improvement consists in handling longer bars throughout the drying period, and then feeding to a stamping machine of the multiple type, bars of soap two or three times the length desired in the individual finished bars, depending on whether the stamp will handle two or more bars simultaneously, and in devices for reducing these long bars after the surface thereof has hardened, to the shorter bars as required by the stamping machine.

The following description will relate to a device for feeding to a stamping machine which stamps three bars simultaneously, although it should be understood that the invention is not limited to this number but may be applied with obvious necessary modifications to machines for handling any number of two or more. Three bars of ordinary size of laundry soap usually have a combined length approximately equal to the width of the frame in which the soap is cooled, and hence the ordinary cutting table first cuts long bars which are then commonly cut into three shorter bars.

By handling the soap in long bars up to the stamping machine, as I now propose, many advantages result. In the first place, the last cutting of the soap at the cutting table into three short bars from the long bar is eliminated, with a saving in time and labor. The drying racks onto which the soap is placed after cutting and on which it is held in the drying kilns may be of much more simple construction, and consist of possibly two supporting slats instead of five as required for supporting three of the smaller sized bars end to end. The transferring of these long bars to the feeding belt conveyor at the stamp involves much less labor than in feeding the equivalent quantity of small sized bars. The cutting of the long bars into three shorter bars as they go into the stamping machine, with the use of my improvement, requires no additional time or labor, and no measurable increase in power.

The accompanying drawings illustrate the improvement.

Figure 1 represents a side elevation, with parts in section, of a portion of a triple die box soap stamp with my preferred mechanism for elevating long bars of soap, for cutting the long bars into individual bars, and for feeding them to the die box of the stamp shown in operative position relative to the soap stamp.

Fig. 2 is an enlarged detail side elevation showing the elevating mechanism from the opposite side from which the view in Fig. 1 was taken.

Fig. 3 is a plan view of my preferred mechanism for elevating and cutting long bars into individual bars which is formed as a unit and placed in operative position relative to the soap stamp frame.

Fig. 4 is a side elevation of the attachment shown in Fig. 3.

Figure 5:
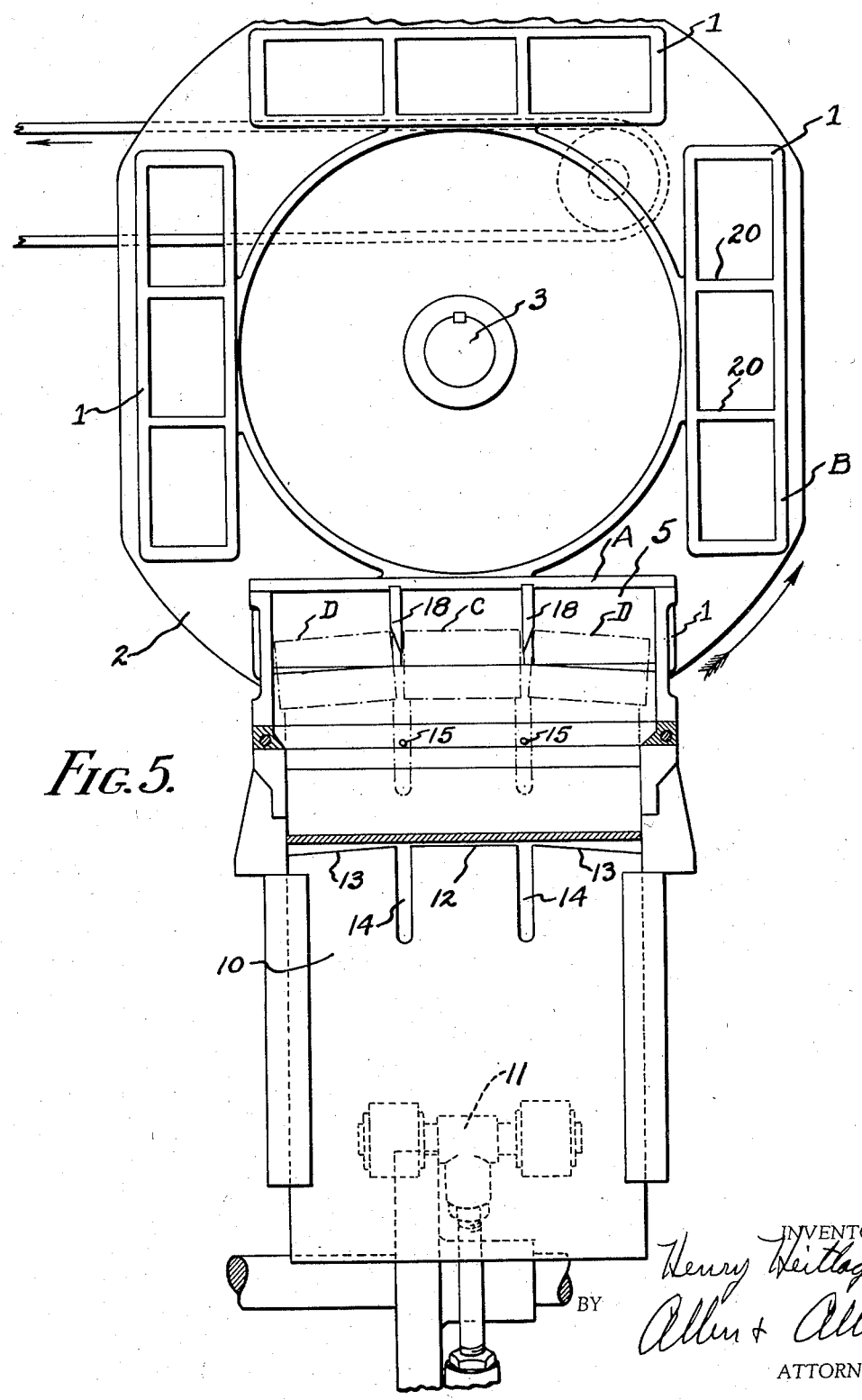
Fig. 5 is a front elevation, with parts in section, as indicated by lines 5, 5 in Fig. 1.

Referring first to Figs. 1 and 5, the regular parts of the soap stamp, which form no part of my invention, are indicated. The die boxes 1, which will be noted receive and stamp three bars of soap at a time, are encased in a turret head 2, which rotates by means of a Geneva movement on a horizontal axis 3.

The bars are received in the die boxes in the position indicated at A in Fig. 5, and the stamping operation occurs when the bars have been moved to the position indicated at B in Fig. 5. A pusher 4 pushes the bars from the receiving chamber 5 into the die boxes, and after the bars are stamped, a pusher 6 pushes the bars out from the die box from which they are fed on a conveyor, usually to the wrapping machine.

As has been stated, the soap stamp proper forms no part of my invention.

My improvement consists of an elevating and cutting unit, generally indicated at 7 in Figs. 3 and 4, which has a T-shaped boss 8 which fits within a slot 9 machined in the frame of the soap stamp.

My attachment consists of a lifting block 10, which is alternately elevated and lowered by means of crank or link mechanism illustrated at 11 in Figs. 1 and 5. The use of a lifting block with a crank or link mechanical movement for operating it, is not broadly new, except in the particular type of lifting block which I employ. As will be noted in Figs. 5 and 6, the upper surface of the lifting block is provided with a central portion 12, which, in the case of elevating bars of soap which are to be cut into three individual bars, will have its surface horizontal. On each side of the central panel 12 of the lifting blocks are surfaces having an incline as indicated at 13 in Figs. 5 and 6, and between the portions 12 and 13, slots 14 are provided which allow clearance for the wires, which, as will be later described, cut the bars into individual sized bars or cakes during the lifting and feeding movement.

Figure 6:
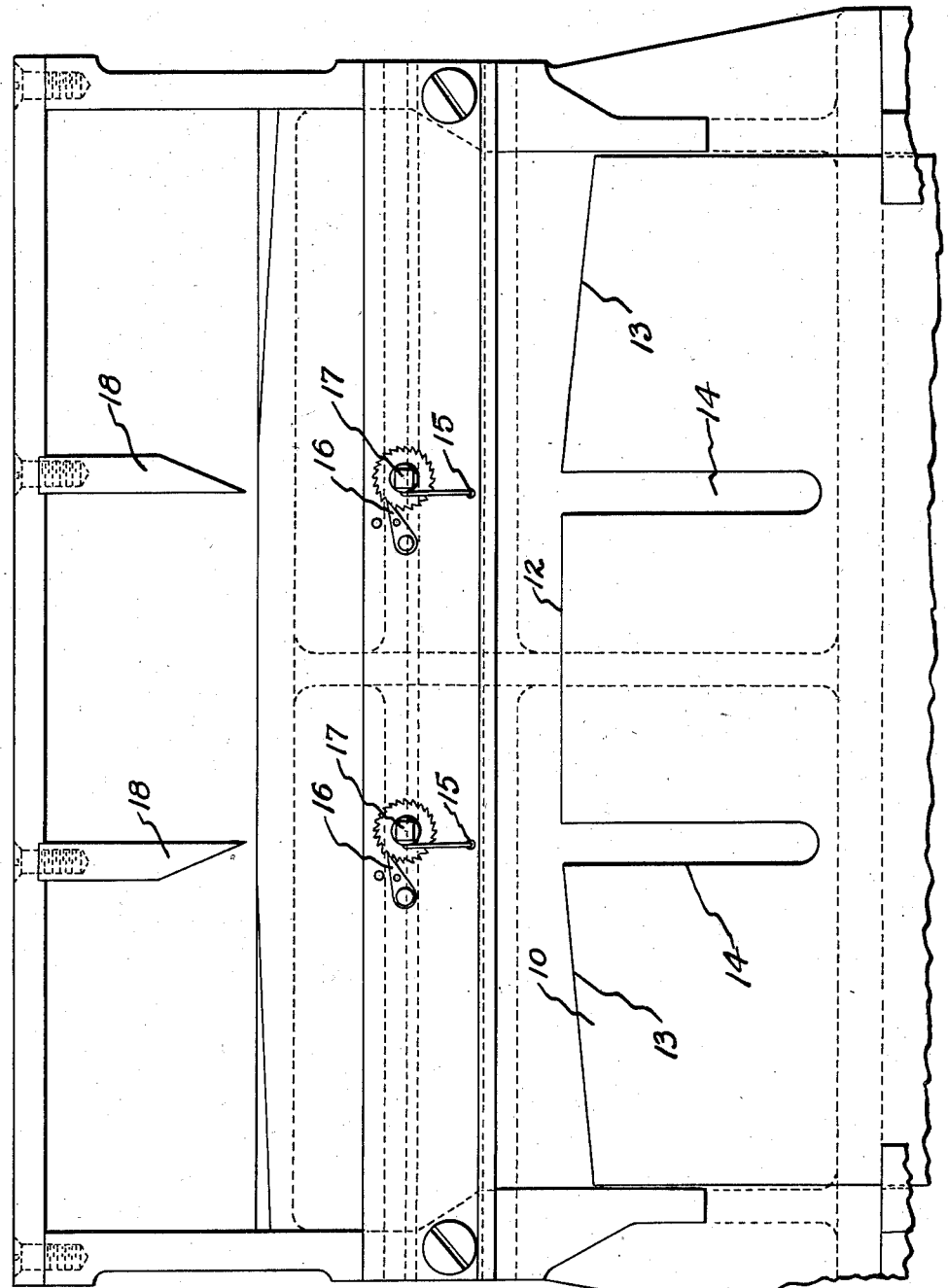
Fig. 6 is a front elevation of the parts indicated in side elevation in Fig. 2.

Referring to Figs. 3 and 6, it will be noted that wires 15 are stretched across the space through which the long bars are elevated by the lifting block, and that a pawl and ratchet mechanism 16 is provided which will permit the operator, by turning the squared ends 17 of the ratchet axes to tighten the cutting wires as desired.

In the same vertical plane as the cutting wires, I have mounted dividing plates 18, which, after the soap is cut into individual bars, separate the bars so that the middle one remains with its sides horizontal, and the two outside ones tilt so that their lower edges rest flatwise on the inclined surfaces 13. The position of the bars during the separating operation is illustrated in Fig. 5, in which, in dotted lines, "C" represents the middle bar, and "D" represents the two outside bars. The lifting block moves from the position shown in solid lines in Fig. 5 upwardly, and the slots 14 register with the cutting wires 15, so that the cutting wires will not interfere with the lifting of the bars to their position for delivery into the soap stamp.

The bottom surfaces of the guiding chamber 5, especially those adapted to guide the inclined bars, as indicated at 19 in Figure 1, are beveled so that as the separated bars of soap are pushed from the upper surface of the lifting block 10 by the pushing member 4 through the guide chamber, the inclined bars are guided into the die boxes in a horizontal position separated from adjacent bars an amount equal to the thickness of the walls 20 between the die boxes.

The operation of my mechanism will be apparent from the foregoing description. The long bars of soap indicated at 23 in Fig. 1 are fed by means of the conveyor belt 21 and slide plate 22 into position on top of the lifting block 10. They are then elevated to the level of the receiving chamber 5, during which there are cut three bars, and separated by means of the separating plates 18. The pushers 4 then move the individually cut and separated bars into position to be received in the die box, and the operation of stamping and otherwise finishing the bars prior to packing is proceeded with in the usual manner.

It should be understood that the operation of cutting soap by pressing soap slabs against wires is old, but my invention consists in an improvement for existing stamping machines of the multiple type which will permit feeding long bars of soap after the bars have been skin-dried, and then cutting the long bars as they enter the stamping machine, with a resulting economy in cutting and handling the soap in all of the various factory operations of cutting, drying, feeding and stamping, over any existing practice of which I am advised.

Various modifications may be made in carrying out my invention without departing from the principle involved; for example, the cutting and separating of the shorter bars may be carried out in a horizontal plane instead of in a vertical plane, and other variations may be used. My invention includes the general principle of handling long bars throughout the original cutting of the frames of soap and the racking and drying operation, and in not cutting the long bars into the shorter individual size bars until just preceding the actual step of stamping. As has been stated, my invention is illustrated in connection with a triple die box stamp, but the same principle may be employed in connection with a stamp having a die box capacity of two or more individual bars.

Having thus described my invention, what I claim as new and desire to secure by Letters Patent, is:—

1. In combination with a machine of the type having a plurality of stamping devices with auxiliary guide and die boxes so arranged as to permit simultaneously stamping a plurality of bars of soap, means for cutting long bars of soap into a plurality of shorter bars equal to the number simultaneously stamped by said stamping machine, and means for feeding said shorter bars into said stamping machine.

2. In combination with a machine of the type having three stamping devices with auxiliary guide and die boxes so arranged as to permit simultaneously stamping three bars of soap, means for cutting surface dried long bars of soap into three shorter bars, and means for feeding said shorter bars into said stamping machine.

3. In combination with a machine of the type having a plurality of stamping devices with auxiliary guide and die boxes so arranged as to permit simultaneously stamping a plurality of bars of soap, means for cutting surface dried long bars of soap into a plurality of shorter bars equal to the number simultaneously stamped by said stamping machine, and means for feeding said shorter bars into said stamping machine, said means comprising means for separating said bars subsequent to their being cut.

4. In combination with a machine of the type having a plurality of stamping devices with auxiliary guide and die boxes so arranged as to permit simultaneously stamping three bars of soap, means for cutting surface dried long bars of soap into three shorter bars, and means for feeding said shorter bars into said stamping machine, said means comprising means for separating said bars subsequent to their being cut.

5. A machine for stamping simultaneously a plurality of bars of plastic material, having in combination, a stamping device with auxiliary guide and die boxes, a reciprocating, elevating member adapted to lift long bars of said material into position substantially aligned with the die boxes, a cutting member adapted to cut long bars as said bars are elevated into the number of short bars which are to be simultaneously stamped, means mounted above the cutting members for separating the shorter bars each from the other a predetermined distance when said bars are lifted by said elevating member, and a guide box so mounted relative to the die box of the stamping machine as to guide said shorter bars as said shorter bars are pushed from their elevated position into the die box.

6. A machine for simultaneously stamping a plurality of bars of plastic material having in combination means for receiving long bars of said material, for cutting and separating same into a plurality of shorter bars equal in number to the number to be simultaneously stamped and for guiding said shorter bars into the die boxes of said stamping machine, comprising a lifting member, cutting members, wedge members, and a guide box, said lifting member being adapted to receive a long bar on its upper surface and elevate same into position in front of said guide box, the upper surface of said lifting member being divided into sections by slots located in alignment with said cutting members to permit the upper surface of said lifting member to pass said cutting members when being elevated as aforesaid, adjacent sections of said upper surface being inclined from each other at the respective slots at an obtuse angle to assist in separating the shorter bars.

7. A machine for simultaneously stamping a plurality of bars of plastic material having in combination means for receiving long bars of said material, for cutting and separating same into a plurality of shorter bars, and for guiding said shorter bars into the die boxes of said stamping machine, comprising a lifting member, cutting members, wedge members, and a guide box, said cutting members being so mounted as to cut said long bar into a number of shorter bars equal to the number to be simultaneously stamped, when said bar is elevated by said lifting block.

8. A machine for simultaneously stamping a plurality of bars of plastic material having in combination means for receiving long bars of said material, for cutting and separating same into a plurality of shorter bars equal in number to the number to be simultaneously stamped, and for guiding said shorter bars into the die boxes of said stamping machine, comprising a lifting member, cutting members, wedge members, and a guide box, said wedge members being mounted above the cutting members so as to separate the shorter bars each from the other a predetermined distance when said bars are elevated by the lifting member.

9. A machine for simultaneously stamping a plurality of bars of plastic material having in combination means for receiving long bars of said material, for cutting and separating same into a plurality of shorter bars equal in number to the number to be simultaneously stamped, and for pushing and guiding said shorter bars into the die boxes of said stamping machine, comprising a lifting member, cutting members, wedge members, and a guide box, said guide box being mounted in front of the die box of the stamping machine and adapted to receive the shorter bars as these shorter bars are elevated into position by the lifting member and pushed through said guide box into the die box of the stamping machine, and being so beveled as to correspond to the sloping surface of the lifting block and to deliver all of said bars in a horizontal position into the die box.

10. The method of handling and simultaneously cutting and stamping soap, which comprises cutting soap into long bars having a length equal to the combined length of a plurality of the required finished bars continuously feeding said long bars into a stamping position, simultaneously cutting said long bars into a plurality of shorter bars and stamping said shorter bars.

11. The method of handling and simultaneously cutting and stamping soap, which comprises cutting soap into long bars having a length equal to the combined length of three of the required finished bars, drying said long bars, continuously feeding said long bars into a stamping position, simultaneously cutting said long bars into three shorter bars and stamping said three shorter bars.

HENRY HEITLAGE.